US008218402B2

(12) United States Patent
Lewis et al.

(10) Patent No.: US 8,218,402 B2
(45) Date of Patent: Jul. 10, 2012

(54) MULTI DEVICE PROGRAMMABLE COOKING TIMER AND METHOD OF USE

(76) Inventors: Bradly Joel Lewis, Portland, OR (US); Vernon Ray Gillespie, Portland, OR (US)

(*) Notice: Subject to any disclaimer, the term of this patent is extended or adjusted under 35 U.S.C. 154(b) by 834 days.

(21) Appl. No.: 12/322,208

(22) Filed: Jan. 29, 2009

(65) Prior Publication Data
US 2010/0186600 A1    Jul. 29, 2010

(51) Int. Cl.
*G04F 1/00* (2006.01)
(52) U.S. Cl. ............................. 368/108; 99/327; 368/10
(58) Field of Classification Search .................. 368/10, 368/108; 99/327
See application file for complete search history.

(56) References Cited

U.S. PATENT DOCUMENTS

| | | | | |
|---|---|---|---|---|
| 4,302,662 A * | 11/1981 | Kicherer et al. | ............. | 219/491 |
| 7,677,792 B2 * | 3/2010 | Saunders et al. | ............. | 366/281 |
| 2002/0189462 A1 * | 12/2002 | Guess | .............................. | 99/326 |
| 2003/0178411 A1 * | 9/2003 | Manganiello et al. | ........ | 219/496 |
| 2005/0160920 A1 * | 7/2005 | Guess | .............................. | 99/419 |
| 2006/0081607 A1 * | 4/2006 | Niiyama et al. | ............... | 219/497 |
| 2006/0278095 A1 * | 12/2006 | Saunders et al. | ................ | 99/348 |
| 2008/0296285 A1 * | 12/2008 | Arione et al. | .................. | 219/413 |
| 2009/0188912 A1 * | 7/2009 | Kanbara et al. | ............... | 219/702 |
| 2010/0178395 A1 * | 7/2010 | Embury et al. | ................ | 426/231 |
| 2011/0108546 A1 * | 5/2011 | Cho et al. | ...................... | 219/620 |

* cited by examiner

Primary Examiner — Sean Kayes
(74) Attorney, Agent, or Firm — Mark S. Hubert

(57) ABSTRACT

A programable timer that simultaneously operates cooking stages made of a modulated power level and time interval to multiple cooking devices. The timer may be operated in a manual or automatic mode. The automatic mode cycles through a set of cooking stages set by a recipe stored in memory. When in the automatic mode, the timer may be put into override and the recipe's cooking stages adjusted to conform with the chef's desires. Pre generated recipes may be input from media transfer devices or programmed into the timer via an input interface device. An algorithm stored in memory adjusts the cooking stages of the various devices such that all foods are finished cooking at the same time if desired.

13 Claims, 3 Drawing Sheets

MULTI DEVICE PROGRAMMABLE COOKING TIMER AND METHOD OF USE

BACKGROUND OF THE INVENTION

The present invention relates to a multi stage programable power level timer adapted to modulate the heat output simultaneously to a plethora of cooking devices. More particularly, a device that provides a way to attain predictable, repeatable culinary results with a consolidated completion time for all foods.

The American populace is enamored with food. Food fairs and TV cooking shows are on the rise not to mention the growth of neighborhood and chain specialty food stores. The cooking appliance world has met this challenge with an array of computerized smart cooking appliances and appliances specifically tailored to do just one thing well. Unfortunately these appliances are costly and out of many chef's budgets.

In its simplest terms cooking appliances apply heat to food. The better the appliance the more precise control it has over its heat output. The prior art combines precise computer controllers in individual cooking appliances such as "smart ovens" that have timer switched outlets that other devices can connect to and be controlled by. However, the lower end cooking devices such as electric grills, electric frypans, counter top ovens, hot plates and the such generally have crude, single stage, temperature or timer settings. None of the prior art coordinates the cooking of multiple devices at the same time for a unified completion.

The cooking timer maintains the desired heat output (power level) of several devices at the same time by modulating on and off the various devices' power. Each device may be operated at several different power levels for several different periods of time. These accommodate such culinary procedures as searing, brazing, cooking, rapid cooking, simmering, and warming. The cooking timer may be operated in a manual, automatic or override (programable) mode. A fourth mode, the setup mode is utilized to input several of the parameters that the cooking timer's microprocessor needs to know to enable the cooking algorithm to function properly. In the manual mode each heat level and time interval combination (cooking stages) must be set. In the auto mode, recipes can be imported, recalled from memory or programmed in. In auto, the weight of the food is input and the cooking timer cycles through the various cooking stages until the food is cooked. If more than one device is being used a cooking algorithm adjusts the time and power parameters of the cooking stages of the quickest cooked food so that it reaches completion with the slowest food cooked, with stand time included for those recipes that require a period of non heated cooking. This cooking algorithm also operates the power management of all the attached devices so as to ensure that the power rating limitations are not exceeded in both continuous operation and upon power changes in the devices. When in auto mode, the timer may be switched to the override mode momentarily so as to adjust the power and time parameters. This allows the chef to fine tune the various stages of cooking to adjust for particular taste, elevation etc. This also reprograms and stores the modified recipe if the user so desires. In this way cooks can exactly duplicate previous methods of cooking, and have all their food finish cooking at the same time. The prior art is replete with cooking timers, but none that adjust the cooking temperature by modulating on and off the power to the cooking device. This puts precise temperature control in the hands of the chef, which is especially important with "non smart" and single temperature cooking devices such as electric skillets, sandwich presses, hot plates etc.

Henceforth, a multi device programable cooking timer would fulfill a long felt need in the cooking industry. It will allow inexpensive cooking devices to function like the more expensive "smart" computer controlled devices, thus bringing precise cooking into all households, or allowing repeatable cooking results for restaurants. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a programable cooking timer that is able to automatically coordinate the simultaneous operation of multiple cooking devices through various power and timed cooking stages.

It has many of the advantages mentioned heretofore and many novel features that result in a new cooking timer which is not anticipated, rendered obvious, suggested, or even implied by any of the prior art, either alone or in any combination thereof.

In accordance with the invention, an object of the present invention is to provide an improved cooking timer capable of automatic cooking based on a series of power and time intervals executed from stored memory.

It is another object of this invention to provide an improved cooking timer capable of performing an algorithmic function that adjusts the cooking stages of multiple devices for desired completion times and manages the power so as to eliminate power spikes and periods of excessive power draw.

It is a further object of this invention to provide an improved cooking timer that stores a set of modifiable machine executable cooking recipes that may be imported into its memory.

It is still a further object of this invention to provide for an improved cooking timer that may manually control the power and timed cooking intervals of multiple devices.

It is yet a further object of this invention to provide an improved cooking timer that is programable for various stages of power and timed cooking to be carried out in an automatic mode.

Lastly, it is an object of this invention to provide for controlling the timed cooking of a cooking device and adjusting the temperature of the cooking device by modulating the power to the cooking device, based on a set of input parameters that reflect the altitude, power input rating and device power consumption.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
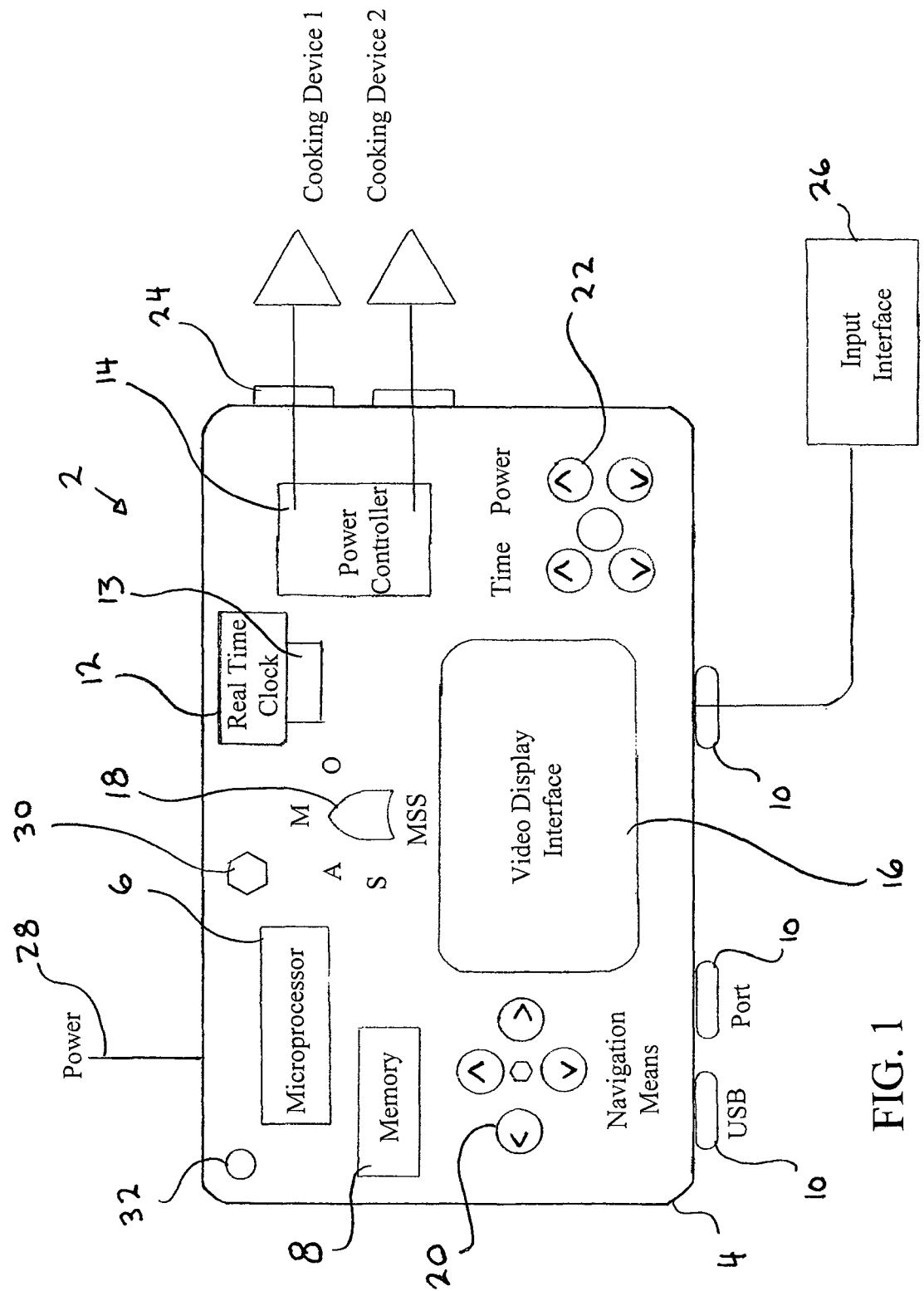
FIG. 1 is a block diagram of the multi device programable cooking timer showing the general arrangement of all components.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practised and carried out in various ways. Also, it is to be understood that the phraseology and terminology employed herein are for the purpose of descriptions and should not be regarded as limiting.

Referring to FIG. 1, a block diagram of the multi device, programable cooking timer, the elements and their cooperative structure can best be seen. The timer 2 has an external housing 4 that supports internally a printed circuit board that has in electrical communication thereon: a microprocessor means 6; a non volatile digital storage system memory 8 (for power loss or brownout protection); external data ports 10 of the USB, serial, parallel, ethernet, wireless or firewire style to allow data input/output from data storage devices and input interfaces such as keyboards 26; a real time clock 12; real time clock battery backup 13; a power controller 14; a video display interface 16; a mode selector switch 18; a set of navigational controls 20; a set of cooking parameter controls 22; a set of cooking device power outlets 24; an audio alert means 30; an AC power source 28; and a power status indicator 32.

It is to be noted that long term memory may be interal like SRAM or external memory like storage cards, USB flash drives or other portable storage media.

When the mode selector switch 18 is switched to the setup mode, the user inputs the following information via the navigation means buttons 20 and the video display interface 16: the current time; the electrical current rating of the power input line (default is set for 10 amperes); the elevation where the timer is located; the cooking timer's output power line ID for the cooking devices; the power rating of the various cooking devices. These parameters are necessary for the cooking algorithm to be able to coordinate the unified cooking operation of the various cooking devices as well as control the power demand to maintain safe operating currents and peak power demands.

When the mode selector switch 18 is selected to automatic mode, the microprocessor means 6 receives compiled data from either of the non volatile long term or short term system memory 8 calculated by the cooking algorithm, as to which cooking device to control, the cooking temperature and cooking time, the rate of power increase and the maximum power output, as well as time input from the real time clock. The microprocessor 6 sends a signal to the power controller 14 as to which power outlet 24 (device ID) receives what amount of power for what period of time. (In the second alternate embodiment the source of cooking heat will be by gas and the power controller will drive the position of a gas control valve.) This signal may or may not be generated through the application of a cook adjust algorithm encoded on the microprocessor. This signal may also be altered by engaging the mode selector switch 18 to select manual or override and manually manipulating the cooking parameter controls 22. The power controller 14 modulates the power to each cooking device to maintain the desired power input level (temperature.) In this way the temperature of many of the single temperature cooking devices, such as the popular counter top grills, can be altered. Knowing the specific power ratings of the various devices, the cooking algorithm ensures that the sum of the electrical current being dispersed at any time does not exceed the line current rating for the outlet that the cooking device draws its power from. While there is a plethora of recipes stored in the memory, more can be added by data transfer through the ports 10 or direct input through an input interface 26. The operational menus of the microprocessor's program may be accessed from the navigation means buttons 20 and the selection of certain inputs may be also accomplished with these buttons 20. AC power 28 operates the timer 2 as well as the cooking devices. The modulating nature of the electric pulses as defined by the cooking algorithm is such that no cooking device is receiving its power at the precise time another cooking device is receiving its power if the sum of the output current would exceed the line's current limitations. This prevents any over current situations in the operation of the timer 2 and ensures that a non attendant chef won't return to find his cooking timer 2 and associated cooking devices have tripped a breaker and been shut off. The cooking parameter controls 22 only function in the manual or override modes, and increase or decrease the power and time parameters of the operating cycle by preset incremental amounts.

The theory behind the operation of the timer 2 is that finer cooking generally dictates that a single recipe have multiple cooking cycles in order to accommodate the addition of ingredients, or just to maximize the food's flavor. For example; a roast may have a high heat short duration brazing cycle followed by a medium heat medium duration cooking cycle after the addition of potatoes and carrots, followed by a low heat long duration simmer cycle after the addition of spices, and finally a stand time where no heat is input as the roast internally cooks. If green beans are also being cooked, their cooking device may remain unpowered while the roast goes through the first two cycles then turn on for a high heat short duration cycle followed by a low heat cycle that ends simultaneously with the roast's simmer cycle. While the individual power levels that the roast's cooking device undergoes may vary slightly, the temperature holds fairly steady due to the mass of the cooking food.

The cooking results of a single cycle come from a level of heat (energy) being input to the food for a period of time. The product of these two parameters in a cycle is the amount of work performed in cooking the food. Experimental taste testing has shown that while the amount of work required to produce repeatable flavors (or get the food to the end of a stage) has a narrow range of values, how the amount of work is accomplished has much broader ranges. For example, while the second cooking cycle of a two lb stuffed London broil may take medium high heat (350° F.) in a counter top oven for 38 minutes, it would still have a similar texture and flavor if it were cooked at medium heat (332° F.) for 46 minutes, or at a lower heat (300° F.) for 50 min. The percentage of allowable deviation from the work is much lesser than the percentage of deviation from the energy or period of time. This fact allows and simplifies an algorithmic determination of the acceptable energy and time combinations that will accomplish the same culinary result. This is a critical function when multiple cooking devices are being utilized simultaneously, as would be done when cooking a multi course meal. The microprocessor 6 analyses the various recipes looking at each recipe's total cooking time (inclusive of stand time). It then applies the algorithm to adjust the cooking times and power levels of each recipe (within preset deviations) such that all recipes may get done at the same time. Shorter recipes may be lengthened such that all the food should be ready together, taking into consideration any stand time. Where there is no acceptable mathematical calculation of a power and time combination, low power simmer stages may be added to the shorter, adjusted recipes. Knowing the power consumption of the various cooking devices and the line current rating for the cooking timer's 2 electrical source, the algorithm ensures that this operation is done in an efficient and safe manner. This may require the gradual increase or decrease in power output to the cooking devices rather than a step function increase to ensure that power surges or spikes are avoided.

In operation, the timer 2 may be operated in any of four modes: setup; manual; automatic; and override. A Mode selector switch 18 extends through the front face of the external housing 4 so as to be accessible from the exterior of the timer 2. The setup mode is selected to input some of the parameters used by the cooking algorithm. When the mode selector switch is selected to any of the other three modes, all microprocessor output signals are recorded. This allows the user to overwrite the recipe with the recorded actions when all the cooking is finished, or to store the recorded actions in the memory 8 with a new recipe name.

The manual mode requires the user to determine the parameters of temperature and time per cooking cycle, as well as the number of cycles. When cooking in the manual mode incremental changes in the temperature and time can be made on the fly through the use of the cooking parameter controls 22.

The automatic mode applies cooking cycles from a stored recipe based on the weight of food input to the microprocessor 6. When multiple cooking devices are utilized the microprocessor 6 adjusts the temperature and time components of the various stages of the different recipes so as to ensure that the foods are all completed cooking, have all had adequate stand time when applicable and are ready to be served at the same time. The number of cooking devices that can be controlled may be limited only by the number of power outlets 24 that are controlled by the timer 2. When in automatic mode if the chef wishes to adjust the temperature or cook time they may select the override mode and adjust the parameters for that cooking device.

Figure 2:
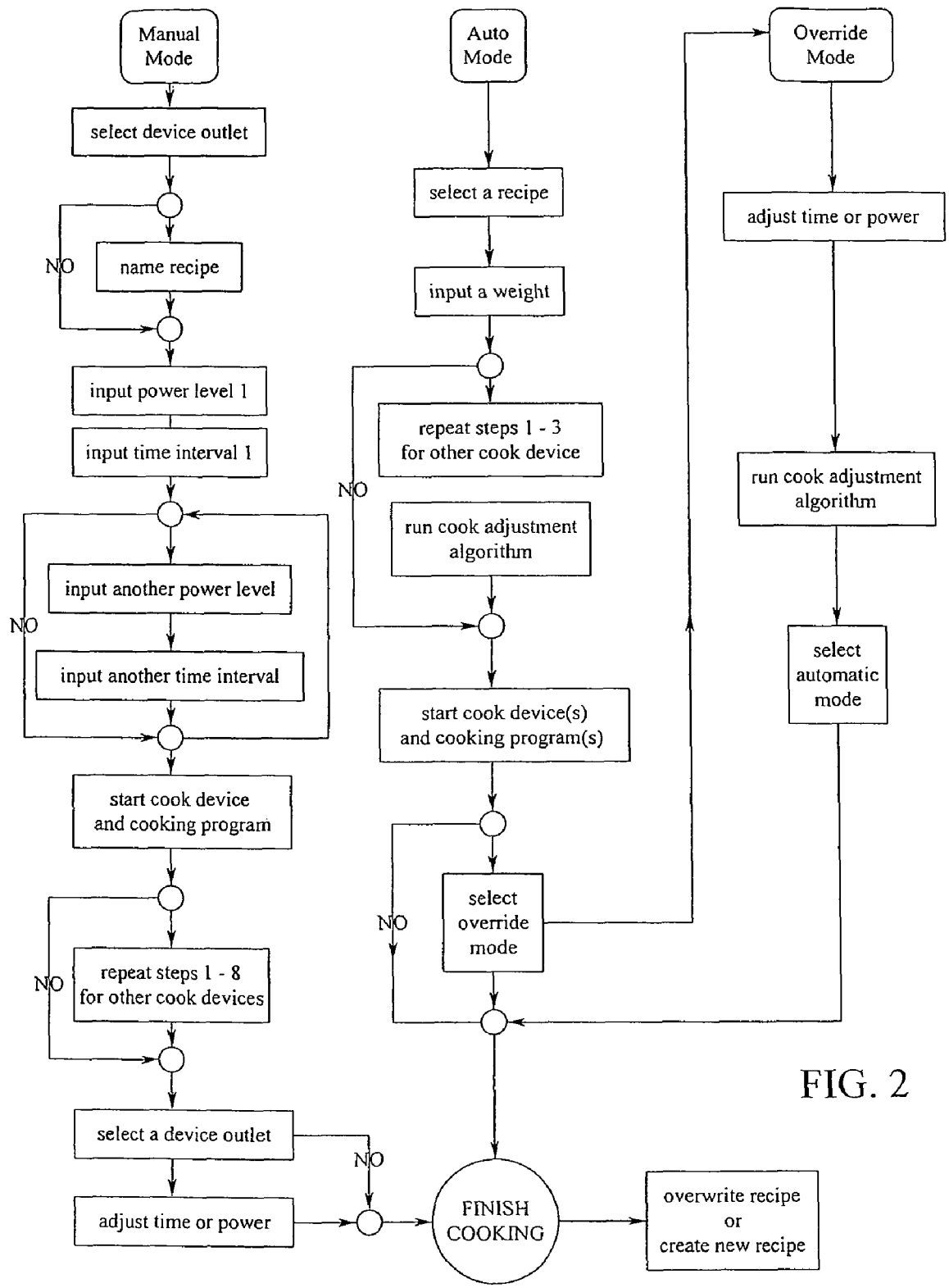
FIG. 2 is a flow chart showing the operational steps for the three modes of the multi device programable cooking timer.

Looking now to FIG. 2 the operation of three of these four modes will be discussed in detail with reference to the operational flow chart.

In the manual mode the cooking devices are plugged into outlets 24. The microprocessor program prompts are initiated and displayed on the video display interface 16. The first prompt queries which outlet the first controlled cooking device is or will be plugged into. Using the navigation means buttons 20 the correct outlet 24 is highlighted and this selection entered. By default operation, the steps of the cooking session with any adjustments will be recorded and compiled into a recipe of cooking stages and stored in the short term portion of memory 8. The user will be prompted to optionally name the recipe at this time using the set of navigation means buttons 20. If the NO option is selected this second prompt is bypassed and not displayed. This step may again be performed at the end of the cooking process. The next two prompts require the navigation means buttons 20 input of power level (temperature level) and cook time interval for the first cooking stage. Depending on the cooking device used, another set of power arid time parameters may be input for the next stage, otherwise the next stage is bypassed. A bypass may occur with timer enabled or self temperature regulated devices such as rice cookers that only have a single stage of cooking. With a multi stage cooking device (such as a grill that has sear, cook and simmer cooking stages) the prompts for input of power levels and cook time intervals for subsequent cooking stages will continue until the bypass option is selected. After the bypass option is selected the microprocessor may query if the device is turned on and plugged in, and the appropriate response is selected. The microprocessor 6 signals the power controller 14 to modulate the power output to the cooking device for the cooking period set. The microprocessor 6 utilizes feedback from the real time clock 12 to accomplish this. The microprocessor then queries if there is another cooking device. If YES is selected the microprocessor cycles through the same set of prompts again. If the selection is NO the microprocessor is finished with the cooking stage input and then queries if there is an adjustment to be made. If the input is YES the next prompt queries which cooking device is to be adjusted. After selection of the appropriate outlet 24, the cooking temperature is displayed and incremental changes to this cooking parameter are made and input using the cooking parameter controls 22. The cooking time period is then displayed and the process is repeated. The microprocessor 6 adjusts the power controller input signals and then queries if there is an adjustment to be made. When the cooking time component is completed the user is queried as to whether they desire the previous actions (as adjusted) that are compiled in the short term memory to be stored in the long term portion of memory 8. If the answer is YES, the user is prompted to input a name for the future retrieval of that specific recipe. The microprocessor 6 then compiles the recipe as adjusted and stores it in the long term portion of memory 8.

In the automatic mode a similar prompt and selection process occurs. However, it does differ from that of the manual operation. Since the device identification has already been input at the setup mode, the selection of the recipe denotes which power outlet 24 is to be controlled. The first prompt is for the selection of a recipe and the input of the cooking weight. After this is input, it queries if another cooking device is to be controlled. If the answer is YES it repeats the previous queries until NO is elected. At this time the cook adjustment algorithm is initiated to run so as to adjust the various stages power levels and cook times so as to coordinate a unified completion time if desired for the cooking devices. If the selection is NO the microprocessor 6 is finished with the cooking stage input and if only one cooking device is utilized, the cook adjust algorithm will affect no changes. The microprocessor 6 prompts the chef to turn on or plug in the cooking devices. The microprocessor 6 controls the cooking as outlined above in accordance with the recipe as adjusted for any other simultaneously cooked foods and the cooking parameter inputs from the setup mode (the electrical current rating of the power input line; the elevation where the timer is located; the cooking timer's output power line ID for the cooking devices; and the power rating of the various cooking devices.) If no adjustments are required, the cooking cycle completes itself and the user is queried as to whether they desire the previous actions (as adjusted) that are compiled in the short term memory to overwrite the existing recipe that is stored in the long term portion of memory 8. If the answer is YES this action is performed and the automatic mode is completed. If the answer is NO the user is queried as to whether they desire the previous actions to be saved as a new recipe. If the answer is YES, the user is prompted to input a name for the future retrieval of that specific recipe. The microprocessor then compiles the recipe as adjusted and stores it in the long term portion of memory 8 and the automatic mode is completed.

If adjustments are to be made, the mode selector switch 18 is set to the override mode. Here the microprocessor queries which cooking device is to be adjusted. After selection of the appropriate outlet 24, the cooking temperature is displayed and incremental changes to this cooking parameter are made and input using the cooking parameter controls 22. The cooking time period is then displayed and the process is repeated. Either one of these parameters may increased, decreased or left at the same value set by the cooking algorithm in light of the recipe and the setup parameters. The cook adjustment algorithm is run and the microprocessor makes the requested power and time adjustments to all of the cooking devices various recipe stages. The chef is then prompted on the display 16 and optionally by an audible signal from audio alert means 30 to move the mode selector switch 18 back to the automatic mode. If further adjustments are required the override mode must be selected again and the process repeated. The cooking cycle eventually is completed.

The cook adjust algorithm is a relatively simple program that looks at the numerical value of the product of time and power for each cycle and adjusts them to achieve a very similar product (within a specified % deviation) but by the adjustment of the time and/or power parameters (within broader % deviations.) This is done to all of the cooking recipes, lengthening the cycles of the shorter ones in an attempt to reach a unified completion time for that recipe. Where the deviations are reached and the times cannot be unified, low power stages are added to the shorter, adjusted recipes. The values input during the setup mode further refine the parameters of allowable power output combined and per cooking device. The elevation data affects a percentage reduction in the overall cooking time based on the height above sea level, as all recipes cooking times are based on 14.7 psi atmospheric pressure.

The degree of repeatability achieved when using the timer 2 can be heightened by paying close attention to the properties of the food such as thickness, starting temperature, shape etc.

Figure 3:
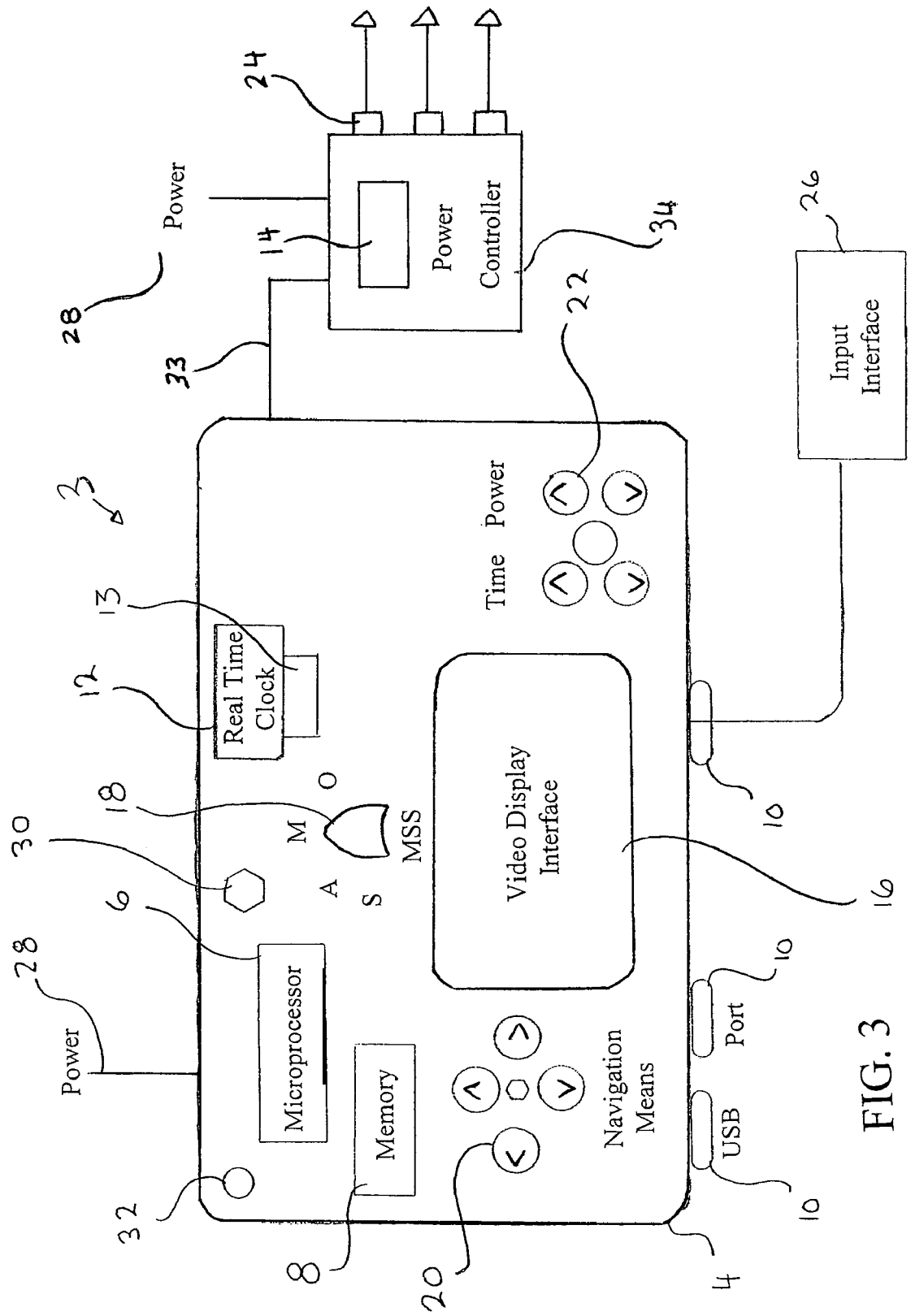
FIG. 3 is a block diagram of the alternate embodiment multi device programable cooking timer.

Looking at FIG. 3 the first alternate embodiment cooking timer 3, it can be seen that here the physical location of the power controller 14 is not physically incorporated into the same casing as the rest of the timer 2 components. Rather, it is housed in a power controller casing 34 and connected to the second timer 3 by signal line 33. This embodiment allows for the controlling of more devices (via more power outlets 24) and at higher power outputs, as the power controller 14 has its own independent input source of electrical power 28 which may be 120 VAC, 240 VAC, 12 VDC, 24 VDC or higher allowing such cooking devices as stoves to be controlled. Other than this configurational difference, the alternate embodiment functions identically to the preferred embodiment.

It is also known that the cooking timer 2 may be modified to operate with gas cooking devices. In a second alternate embodiment, (not illustrated) the microprocessor sends a signal to the power controller which then provides an electrical signal to operate a gas control valve. Similar to the preferred embodiment, in the automatic mode an algorithm determines what amount of heat for what period of time will be applied to the cooking device and generates a signal to the power controller to drive the gas control valve to the appropriate opening. This signal may also be generated by engaging the mode selector switch to select manual or override and manually manipulating the cooking parameter controls.

In a second alternate embodiment, communication between the second timer 3 and the power controller 14 may be wireless and thus the need for signal line 33 would be negated. Here there would be wireless transceivers located at the input interface, the power controller and the timer casing.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. For example, the manual rotary or toggle mode selector switch may be eliminated and incorporated into the logic of the microprocessor such that it is operated via the navigation means. The navigation means and cooking parameter controls may be consolidated or incorporated into an interactive touch screen. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A multi device programable cooking timer comprising:
   an external housing;
   a printed circuit board;
   a microprocessor means;
   a digital storage system memory;
   at least one external data port;
   a real time clock;
   a real time clock backup battery;
   a multi cooking device adjustable power controller;
   a video display interface;
   an operational mode selector means;
   a set of navigational controls;
   a set of cooking parameter controls;
   at least two cooking device power outlets;
   an audio alert means;
   a power source; and
   a power status indicator; wherein
   said external housing supports internally said printed circuit board that is in electrical communication with said microprocessor means, said system memory, said external data ports, said real time clock, said temperature controller, said video display interface, said mode selector switch, said navigational controls, said cooking parameter controls, said power controller, said cooking device power outlets, said audio alert means, said power source, and said power status indicator; wherein the adjustable power controller is configured to control a desired heat output of several external devices connected to the at least two cooking device power outlets, by controlling a power supplied to the at least two cooking device power outlets by modulating a frequency of on to off; and the adjustable power controller is further configured to automatically control said power in accordance with at least one recipe stored in the digital storage system memory.

2. The multi device programable cooking timer of claim 1 wherein said microprocessor means has an algorithmic program stored thereon that enables said microprocessor means to analyze input data and make adjustments to recipes stored on said memory so as to optionally coordinate a unified cooking completion time for all said recipes.

3. The multi device programable cooking timer of claim 2 wherein said microprocessor means outputs a signal to said power controller to modulate power to said cooking device power outlets to alter recipe cooking times and temperatures for multiple cooking devices.

4. The multi device programable cooking timer of claim 3 wherein said input data comprises elevation, an electrical power rating of said power source, an electrical power rating for cooking devices connected to said cooking device power outlets, an identification for said cooking devices connected to said cooking device power outlets, an adjustment of a recipe's cooking time, and an adjustment of a recipe's cooking power level.

5. The multi device programable cooking timer of claim 4 wherein said set of cooking parameter controls are manually operated buttons exposed on a face of said housing.

6. The multi device programable cooking timer of claim 4 further comprising a user interface keyboard for data input.

7. The multi device programable cooking timer of claim 1 wherein video display interface has a touch sensitive data input screen and said set of navigational controls and said set of cooking parameter controls are incorporated into said video display interface.

8. The multi device programable cooking timer of claim 1 wherein said set of navigational controls are manually operated buttons exposed on a face of said housing.

9. A multi device programable cooking timer comprising:
 a first external housing;
 a second external housing
 a printed circuit board;
 a microprocessor means;
 a digital storage system memory;
 at least one external data port;
 a real time clock;
 a real time clock backup battery;
 a multi cooking device adjustable power controller;
 a video display interface;
 an operational mode selector means;
 a set of navigational controls;
 a set of cooking parameter controls;
 at least two cooking device power outlets;
 an audio alert means;
 an AC power source;
 a power controller power source;
 a signal wire; and
 a power status indicator; wherein
 said first external housing contains said printed circuit board that is in electrical communication with said microprocessor means, said system memory, said external data ports, said real time clock, said temperature controller, said video display interface, said mode selector switch, said navigational controls, said cooking parameter controls, said audio alert means, said power source, and said power status indicator, and wherein said second external housing contains said power controller which is connected to said power controller power source and said cooking device power outlets, and wherein said microprocessor and said power controller are connected by said signal wire; wherein the adjustable power controller is configured to control a desired heat output of several external devices connected to the at least two cooking device power outlets, by controlling a power supplied to the at least two cooking device power outlets by modulating a frequency of on to off; and the adjustable power controller is further configured to automatically control said power in accordance with at least one recipe stored in the digital storage system memory.

10. The multi device programable cooking timer of claim 9 wherein said microprocessor means has an algorithmic program stored thereon that enables said microprocessor means to analyse input data and make adjustments to recipes stored on said memory so as to optionally coordinate a unified cooking completion time for all said recipes.

11. The multi device programable cooking timer of claim 9 wherein said microprocessor means outputs a signal to said power controller to modulate power to said cooking device power outlets to alter recipe cooking times and temperatures for multiple cooking devices.

12. The multi device programable cooking timer of claim 9 wherein said input data comprises elevation, an electrical power rating of said power controller power source, an electrical power rating for cooking devices connected to said cooking device power outlets, an identification for said cooking devices connected to said cooking device power outlets, an adjustment of a recipe's cooking time, and an adjustment of a recipe's cooking power level.

13. A multi device programable cooking timer comprising:
 a first external housing;
 a second external housing
 a printed circuit board;
 a microprocessor means;
 a digital storage system memory;
 at least one external data port;
 a real time clock;
 a real time clock backup battery;
 a multi cooking device adjustable power controller;
 a video display interface;
 an operational mode selector means;
 a set of navigational controls;
 a set of cooking parameter controls;
 at least two cooking device power outlets;
 an audio alert means;
 an AC power source;
 a power controller power source;
 two transceivers; and
 a power status indicator; wherein
 said first external housing contains said printed circuit board that is in electrical communication with said microprocessor means, a first transceiver, said system memory, said external data ports, said real time clock, said temperature controller, said video display interface, said mode selector switch, said navigational controls, said cooking parameter controls, said audio alert means, said power source, and said power status indicator, and wherein said second external housing contains said power controller, a second transceiver, said power source and said cooking device power outlets, and wherein said microprocessor and said power controller are wirelessly connected by said transceivers; wherein the adjustable power controller is configured to control a desired heat output of several external devices connected to the at least two cooking device power outlets, by controlling a power supplied to the at least two cooking device power outlets by modulating a frequency of on to off; and the adjustable power controller is further configured to automatically control said power in accordance with at least one recipe stored in the digital storage system memory.

* * * * *